United States Patent [19]

Tabata

[11] Patent Number: 5,749,773
[45] Date of Patent: May 12, 1998

[54] SOLID BUFFING COMPOUND

[76] Inventor: Toshikazu Tabata, 3-6, Miyake 1-chome, Minami-ku, Fukuoka-shi Fukuoka 815, Japan

[21] Appl. No.: 616,921

[22] Filed: Mar. 18, 1996

Related U.S. Application Data

[63] Continuation of Ser. No. 381,813, filed as PCT/JP93/01120 filed Aug. 9, 1993, abandoned.

[30] Foreign Application Priority Data

Aug. 11, 1992 [JP] Japan .................... 4-257116
Apr. 6, 1993 [JP] Japan .................... 5-105084

[51] Int. Cl.$^6$ .................................... C09G 1/02
[52] U.S. Cl. ................ 451/66; 451/59; 451/308; 106/10; 106/3
[58] Field of Search .................... 451/59, 66, 492, 451/495, 506; 106/3, 10, 11; 51/293, 295, 304, 308

[56] References Cited

U.S. PATENT DOCUMENTS

| | | | |
|---|---|---|---|
| 3,816,086 | 6/1974 | Ceremsak et al. | 51/308 |
| 4,071,333 | 1/1978 | Like | 51/304 |
| 4,124,523 | 11/1978 | Johnson | 252/145 |
| 5,094,687 | 3/1992 | Elepano | 106/10 |
| 5,141,555 | 8/1992 | Elepano . | |
| 5,476,411 | 12/1995 | Held, III | 451/36 |

FOREIGN PATENT DOCUMENTS

| | | |
|---|---|---|
| 103 718 A2 | 3/1984 | European Pat. Off. . |
| 3829220 A1 | 11/1989 | Germany . |
| 48-41389 | 6/1973 | Japan . |
| 62-297062 | 12/1987 | Japan . |
| 2-269791 | 11/1990 | Japan . |
| 834079 | of 0000 | U.S.S.R. . |

*Primary Examiner*—Eileen Morgan
*Attorney, Agent, or Firm*—Armstrong, Westerman, Hattori, McLeland & Naughton

[57] ABSTRACT

A solid buffing compound made up of polishing powder and a bonding agent, wherein the bonding agent to be used is a good amount of water-soluble surface active agent and/or polyalkylene glycol which is an intermediate thereof; the melting point of said bonding agent is 30° C. or more, and said bonding agent is water soluble so that a buff residue adhering on the surface of product, etc. after buffing may be washed out easily by use of water.

3 Claims, No Drawings

SOLID BUFFING COMPOUND

This application is a continuation of application Ser. No. 08/381,813, filed as PCT/JP93/01120 filed on Aug. 9, 1993, now abandoned.

TECHNICAL FIELD

The present invention relates to a solid buffing compound (usually called as a blue bar, a white bar, or a red bar) which is used in a metal machining industry.

BACKGROUND ART

A conventional solid buffing compound used in polishing a metal surface has been a kneaded mixture of polishing powder and a bonding agent made up of oils and fats such as paraffins and fatty acids, and such a mixture is applied to a buff for polishing a metal surface.

After a buffing, the metal surface of product has been washed to remove the polishing powder, oils, and fats (simply referred to as a buff residue hereinafter) adhering thereon.

However, because the buff residue contains oils and fats as mentioned above, and they are difficult to remove only by washing by use of water, the metal surface of product is usually washed taking a long time by use of a hot water solution in which a surface active agent is dissolved, or washed by use of an organic solvent such as trichloroethylene, or, as needed, further subjected to an ultrasonic wave washing.

Thus, the work to wash out the buff residue has been an extremely troublesome and time-consuming job, raising various problems including those of safety and hygiene of workers, pollution, etc. in case of using an organic solvent such as trichloroethylene.

DISCLOSURE OF INVENTION

The present invention has been made to solve the above disclosed problems and has an object of providing a solid buffing compound which is easy to wash out a buff residue by use of water.

The solid buffing compound according to the first invention with the object mentioned above is a solid mixture of polishing powder and a bonding agent, wherein the bonding agent is a water-soluble surface active agent and/or polyalkylene glycol which is an intermediate thereof and, further, the melting point of said bonding agent is 30° C. or more.

The solid buffing compound according to the second invention with the object mentioned above is a solid mixture of polishing powder and a bonding agent, wherein the bonding agent is a mixture made up of one or two and more of oils and fats, higher alcohol, oil-soluble surface active agent, metallic soap, and paraffin; and a water-soluble surface active agent and/or polyalkylene glycol which is an intermediate thereof and, further more, the mixture is water-soluble and has a melting point of 30° C. or more.

Here the oil-soluble surface active agent means a substance which dissolves in oil but doesn't dissolve or difficult to dissolve in water, that is, for example, ester compound of various fatty acids.

In aforesaid first and second inventions, the reason a bonding agent whose melting point is 30° C. or more is used is that the solid buffing compound will liquefy or soften at an ordinary temperature and become useless as a solid compound if the melting point of the bonding agent is less than 30° C. In addition, if taking into account the practicable aspects of material to be used and the environment in which the solid buffing compound is used, it is preferable to use a bonding agent whose melting point is 40° to 80° C.

Accordingly, in the case of the solid buffing compound relating to the first invention, because the bonding agent is a water-soluble surface active agent and/or polyalkylene glycol which is an intermediate thereof, it dissolves in water in washing out a buff residue after a buffing, making it possible to wash out the buff residue. And, because a water-soluble surface active agent and/or polyalkylene glycol which is an intermediate thereof whose melting point is 30° C. or more is selected, the buffing compound becomes solid if a proper amount of polishing powder is mixed and possible to use like a solid buffing compound on the market which is called a blue bar or a white bar.

In the case of the solid buffing compound relating to the second invention, because the bonding agent is a mixture made up of one or two and more of oils and fats, higher alcohol, oil-soluble surface active agent, metallic soap, and paraffin; and a water-soluble surface active agent and/or polyalkylene glycol which is an intermediate thereof and, further more, the mixture is water-soluble and has a melting point of 30° C. or more, it dissolves in water in washing out a buff residue after a buffing, making it possible to wash out the buff residue.

BEST MODE FOR CARRYING OUT THE INVENTION

Then the examples that embody the present invention will be explained for the purpose of good understanding of this invention.

EXAMPLE 1

800 g of polishing powder made of chromium oxide ($Cr_2O_3$) and 200 g of polyethylene glycol ($HO(CH_2CH_2O)_n CH_2CH_2OH$) which is one example of polyalkylene glycol were put in a beaker made of stainless steel and heated while being stirred. Then they became a paste-like substance and were cast into a container made of aluminum. After being cooled, the substance was taken out of the container as a solid buffing compound. By use of that compound, a product made of stainless steel was buffed and washed. The result of buffing was quite the same as that by use of a conventional buffing compound, and the washing after buffing was easy to complete by use of water of an ordinary temperature.

EXAMPLE 2

700 g of polishing powder made of aluminum oxide ($Al_2O_3$) and 300 g of polyoxyethylene-polyoxypropylene glycolic ether which is one example of a water-soluble surface active agent were put in a beaker made of stainless steel and heated while being stirred. Then they became a paste-like substance and were cast into a container made of aluminum. After being cooled, the substance was taken out of the container as a solid buffing compound. By use of that compound, a trial buffing was performed. The result of buffing was quite the same as that by use of a conventional buffing compound, and the washing after buffing was easy to complete by use of water of an ordinary temperature. In addition, the chemical formula of polyoxyethylene-polyoxypropylene glycolic ether is given as follows.

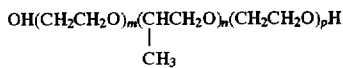

where m, n, and p integers, indicating the polymerization degree

EXAMPLE 3

800 g of polishing powder made of chromium oxide ($Cr_2O_3$), 100 g of polyoxyethylene fatty acid ester (RCOO ($CH_2CH_2O)_n$ CO R) which is one example of a water-soluble surface active agent, and 100 g of polyethylene glycol ($HO(CH_2CH_2O)_n$ $CH_2CH_2$ OH) which is one example of polyalkylene glycol were put in a beaker made of stainless steel and heated while being stirred. Then they became a paste-like substance and were cast into a container made of aluminum. After being cooled and solidified, the substance was taken out of the container and examined its buffing performance and characteristics against washing. The result of buffing was quite the same as that by use of a conventional buffing compound, and the washing after buffing was easy to complete by use of water of an ordinary temperature.

EXAMPLE 4

700 g of polishing powder made of aluminum oxide ($Al_2O_3$) and 300 g of polyoxyethylene alkyl ether phosphate which is one example of a water-soluble surface active agent were put in a beaker made of stainless steel and heated while being stirred. Then they became a paste-like substance and cast into a container made of aluminum. After being cooled and solidified, the substance was taken out of the container and examined for its buffing performance and characteristics against washing. The result of buffing was quite the same as that by use of a conventional buffing compound, and the washing after buffing was easy to complete by use of water of an ordinary temperature. In addition, the chemical formula of polyoxyethylene alkyl ether phosphate is given as follows.

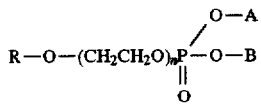

where A and B: H or R—O—$(CH_2CH_2O)_n$
n: integer, indicating the polymerization degree

EXAMPLE 5

800 g of polishing powder made of chromium oxide ($Cr_2O_3$) and 200 g of polyoxyethylene alkyl phenol ether which is one example of a water-soluble surface active agent were put in a beaker made of stainless steel and heated while being stirred. Then they became a paste-like substance and were cast into a container made of aluminum. After being cooled and solidified, the substance was taken out of the container and examined for its buffing performance and characteristics against washing. The result of buffing was quite the same as that by use of a conventional buffing compound, and the washing after buffing was easy to complete by use of water of an ordinary temperature. In addition, the chemical formula of polyoxyethylene alkyl phenol ether is given as follows.

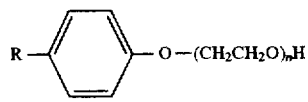

where R : alkyl group

EXAMPLE 6

700 g of polishing powder made of aluminum oxide ($Al_2O_3$) and 300 g of polyoxyethylene-polyoxypropylene block polymer which is one example of a water-soluble surface active agent were put in a beaker made of stainless steel and heated while being stirred. Then they became a paste-like substance and were cast into a container made of aluminum. After being cooled, the substance was taken out of the container and examined for its buffing performance and characteristics against washing. The result of buffing was quite the same as that by use of a conventional buffing compound, and the washing after buffing was easy to complete by use of water of an ordinary temperature. In addition, the chemical formula of polyoxyethylene-polyoxypropylene block polymer is given as follows.

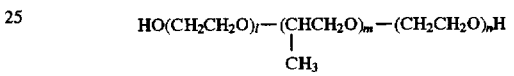

where l, m, and n : integers, indicating the polymerization degree

EXAMPLE 7

750 g of aluminum oxide ($Al_2O_3$) which is polishing powder, 150 g of stearic acid ($CH_3(CH_2)_{16}$ COOH) which is one example of fatty acid, and g of polyoxyethylene sorbitol fatty acid ester which is one example of a water-soluble surface active agent were put in a beaker and heated while being stirred. Then they became a mud-like viscous substance, cast into a mold made of stainless steel, and cooled to be solidified at an ordinary temperature. By use of that substance, a trial buffing was conducted on a machine part made of stainless steel. The feeling in buffing by use of said substance was quite the same as that by use of a conventional solid buffing compound of the same type. The washing after buffing was possible by use of water of a low temperature, and the dip time was reduced to ⅓ that of washing by use of a conventional buffing compound, provided the temperature of the water was the same. In addition, the chemical formula of polyoxyethylene sorbitol fatty acid ester is given as follows.

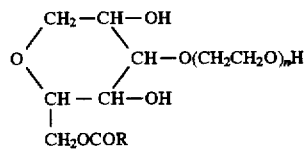

where R: alkyl group
n: integers, indicating the polymerization degree

EXAMPLE 8

750 g of chromium oxide ($Cr_2O_3$) which is polishing powder, 100 g of palmitic acid ($CH_3(CH_2)_{14}$ COOH) which is one example of fatty acid, 50 g of hardened oil, and 100 g of fatty acid polyethylene glycol ester (RCOO ($CH_2CH_2O)_n$ COR) which is one example of a water-soluble surface active agent were put in a beaker and heated while being stirred. Then they became a mud-like viscous substance, cast into a mold made of stainless steel, and cooled to be solidified at an ordinary temperature. By use of that substance, a trial buffing was conducted on a machine part made of stainless steel. The feeling in buffing by use of said substance was almost the same as that by use of a conventional solid buffing compound of the same type. The washing after buffing was possible by use of water of a low temperature, and the dip time was reduced to ½ that of washing by use of a conventional buffing compound, provided the temperature of the water was the same.

EXAMPLE 9

750 g of silicon dioxide ($SiO_2$) which is polishing powder, 100 g of behenic acid ($CH_3(CH_2)_{20}$ COOH) which is one example of fatty acid, 50 g of higher alcohol, and 100 g of polyoxyethylene nonyl-phenyl ether

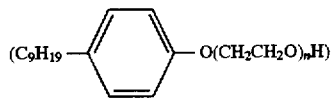

which is one example of a water-soluble surface active agent were put in a beaker and heated while being stirred. Then they became a mud-like viscous substance, cast into a mold made of stainless steel, and cooled to be solidified at an ordinary temperature. By use of that substance, a trial buffing was conducted on a machine part made of stainless steel. The feeling in buffing by use of said substance was almost the same as that by use of a conventional solid buffing compound of the same type. The washing after buffing was possible by use of water of a low temperature, and the dip time was reduced to ½ that of washing by use of a conventional buffing compound, provided the temperature of the water was the same.

EXAMPLE 10

750 g of aluminum oxide ($Al_2O_3$) which is polishing powder, 150 g of stearic acid ($CH_3(CH_2)_{16}$ COOH) which is one example of fatty acid, and 100 g of polyethylene glycol ($HO(CH_2CH_2O)_n$ $CH_2CH_2OH$) which is one example of polyalkylene glycol were put in a beaker and heated while being stirred. Then they became a mud-like viscous substance, cast into a mold made of stainless steel, and cooled to be solidified at an ordinary temperature. By use of that substance, a trial buffing was conducted on a machine part made of stainless steel. The feeling in buffing by use of said substance was almost the same as that by use of a conventional solid buffing compound of the same type. The washing after buffing was possible by use of water of a low temperature, and the dip time was reduced to ½ that of washing by use of a conventional compound, provided the temperature of the water was the same.

EXAMPLE 11

750 g of aluminum oxide ($Al_2O_3$) which is polishing powder, 150 g of sorbitol stearic ester which is one example of an oil-soluble surface active agent, and 100 g of polyoxyethylene nonyl-phenyl ether

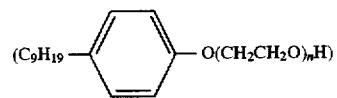

which is one example of a water-soluble surface active agent were put in a beaker and heated while being stirred. Then they became a mud-like viscous substance, cast into a mold made of stainless steel, and cooled to be solidified at an ordinary temperature. By use of that substance, a trial buffing was conducted on a machine part made of stainless steel. The feeling in buffing by use of said substance was almost the same as that by use of a conventional solid buffing compound of the same type, and the washing after buffing was very easy to complete. In addition, the chemical formula of sorbitol stearic ester is given as follows.

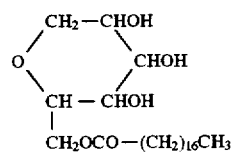

INDUSTRIAL APPLICABILITY

As obvious as disclosed above, in the case of the solid buffing compound relating to the first and the second inventions, it is possible to wash out a buff residue adhering on the product surface by use of water because aforesaid bonding agent dissolves in water, and it is also possible to simplify the buffing equipment because aforesaid buffing compound requires no extra detergent nor solvent. Furthermore, because the buff residue can be washed out by use of cold water as well as hot one, it is possible to simplify the washing work and to reduce the washing time.

I claim:

1. Buffing equipment for polishing a metal surface comprising a buff and a solid buffing compound applied to the buff, the solid buffing compound comprising a mixture of polishing powder and a bonding agent substantially made of a water soluble surface active agent, wherein said bonding agent is water soluble and has a melting point of 40° to 80° C.

2. Buffing equipment for polishing a metal surface comprising a buff and a solid buffing compound applied to the buff, the solid buffing compound comprising a mixture of polishing powder and a bonding agent substantially made of polyalkylene glycol which is an intermediate of a water soluble surface active agent, wherein said bonding agent is water soluble and has a melting point of 40° to 80° C.

3. Buffing equipment for polishing a metal surface comprising a buff and a solid buffing compound applied to the buff, the solid buffing compound comprising a mixture of polishing powder and a bonding agent substantially made of a water soluble surface active agent and polyalkylene glycol which is an intermediate of said water soluble surface active agent, wherein said bonding agent is water soluble and has a melting point of 40° to 80° C.

* * * * *